May 7, 1929. R. CRAMER Re. 17,288

REFRIGERATING APPARATUS

Original Filed June 4, 1921 4 Sheets-Sheet 1

Witness
Martin H. Haen.

Inventor
Robert Cramer
By Rector, Hibben Davis & Macauley
His Attys

May 7, 1929. R. CRAMER Re. 17,288
REFRIGERATING APPARATUS
Original Filed June 4, 1921 4 Sheets-Sheet 2
Fig. 2.
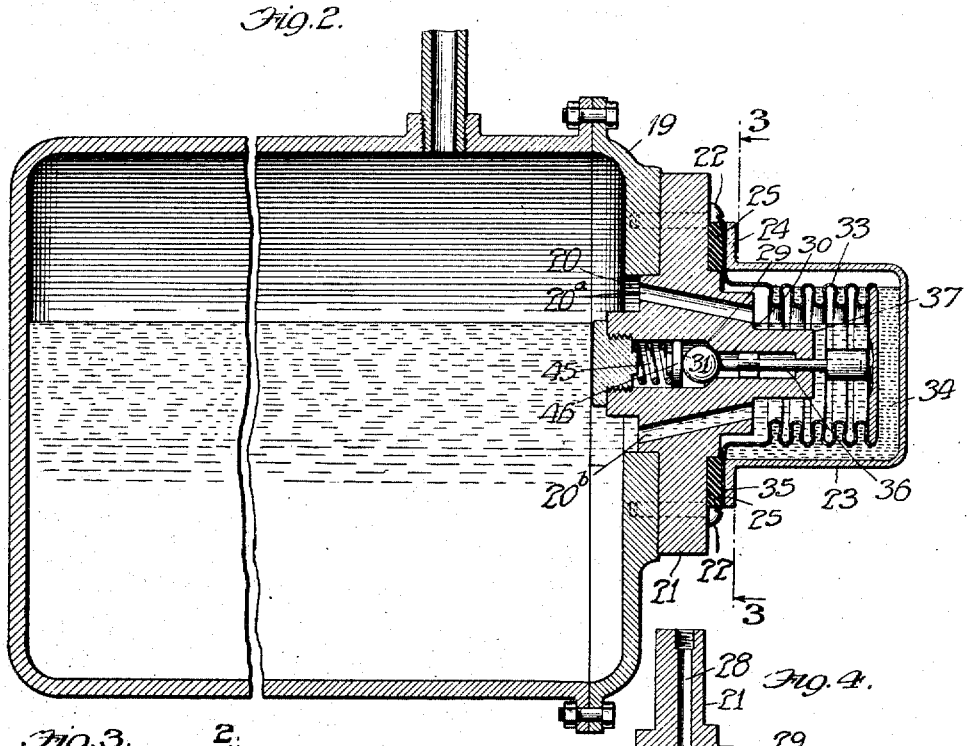
Fig. 3.
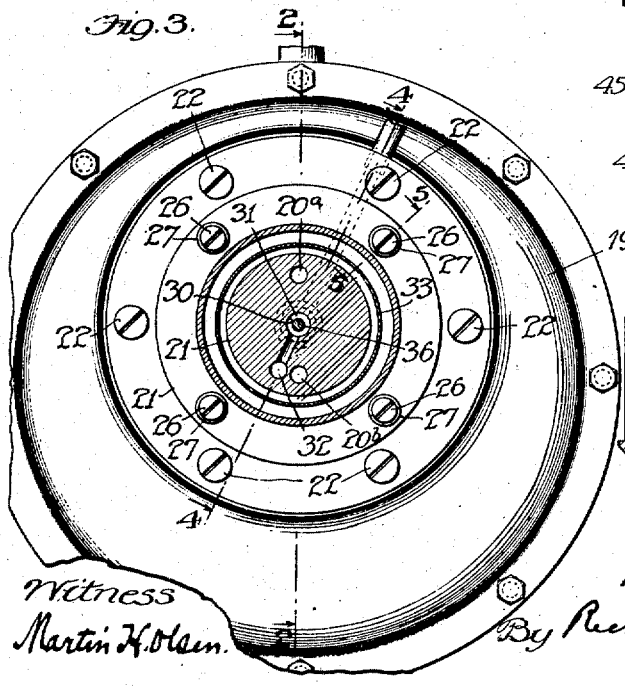
Fig. 4.
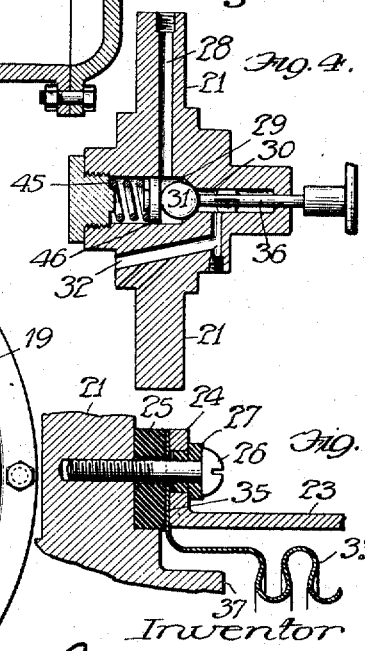
Fig. 5.
Witness
Martin H. Olsen.
Inventor
Robert Cramer
By Rector, Hibben, Davis & Macauley
His Attys May 7, 1929. R. CRAMER Re. 17,288

REFRIGERATING APPARATUS

Original Filed June 4, 1921 4 Sheets-Sheet 3

Witness
Martin H. Olsen

Inventor
Robert Cramer
By Rector, Hibben, Davis & Macauley
His Attys

May 7, 1929.

R. CRAMER

REFRIGERATING APPARATUS

Re. 17,288

Original Filed June 4, 1921 — 4 Sheets-Sheet 4

Witness
Martin H. Olsen.

Inventor
Robert Cramer
By Rector, Hibben, Davis & Macauley
His Attys.

Reissued May 7, 1929. Re. 17,288

UNITED STATES PATENT OFFICE.

ROBERT CRAMER, OF MILWAUKEE, WISCONSIN, ASSIGNOR, BY MESNE ASSIGNMENTS, TO FRIGIDAIRE CORPORATION, A CORPORATION OF DELAWARE.

REFRIGERATING APPARATUS.

Original No. 1,642,015, dated September 13, 1927, Serial No. 474,969, filed June 4, 1921. Application for reissue filed February 11, 1929. Serial No. 339,254.

My invention relates to refrigerating apparatus in which a refrigerant such as sulfur dioxid is employed and to the flooded type thereof in which a flooded receptacle or evaporator is used for the liquid refrigerant. One of the objects of my invention is to provide an efficient and reliable apparatus of this type having a novel means for regulating the liquid level in the evaporator, which means is characterized by a valve controlling the inlet of refrigerant into the evaporator and governed by the action of a trapped body of refrigerant which is separate and independent from the liquid refrigerant in the evaporator, with the result that the proper predetermined level of the refrigerant in the evaporator is maintained.

Another object of my invention is to provide a novel and efficient system of refrigeration including the type of apparatus above described and a series of independently controlled cooling coils or refrigerators operating in conjunction with a single plant or apparatus of the type above described.

Figure 1:
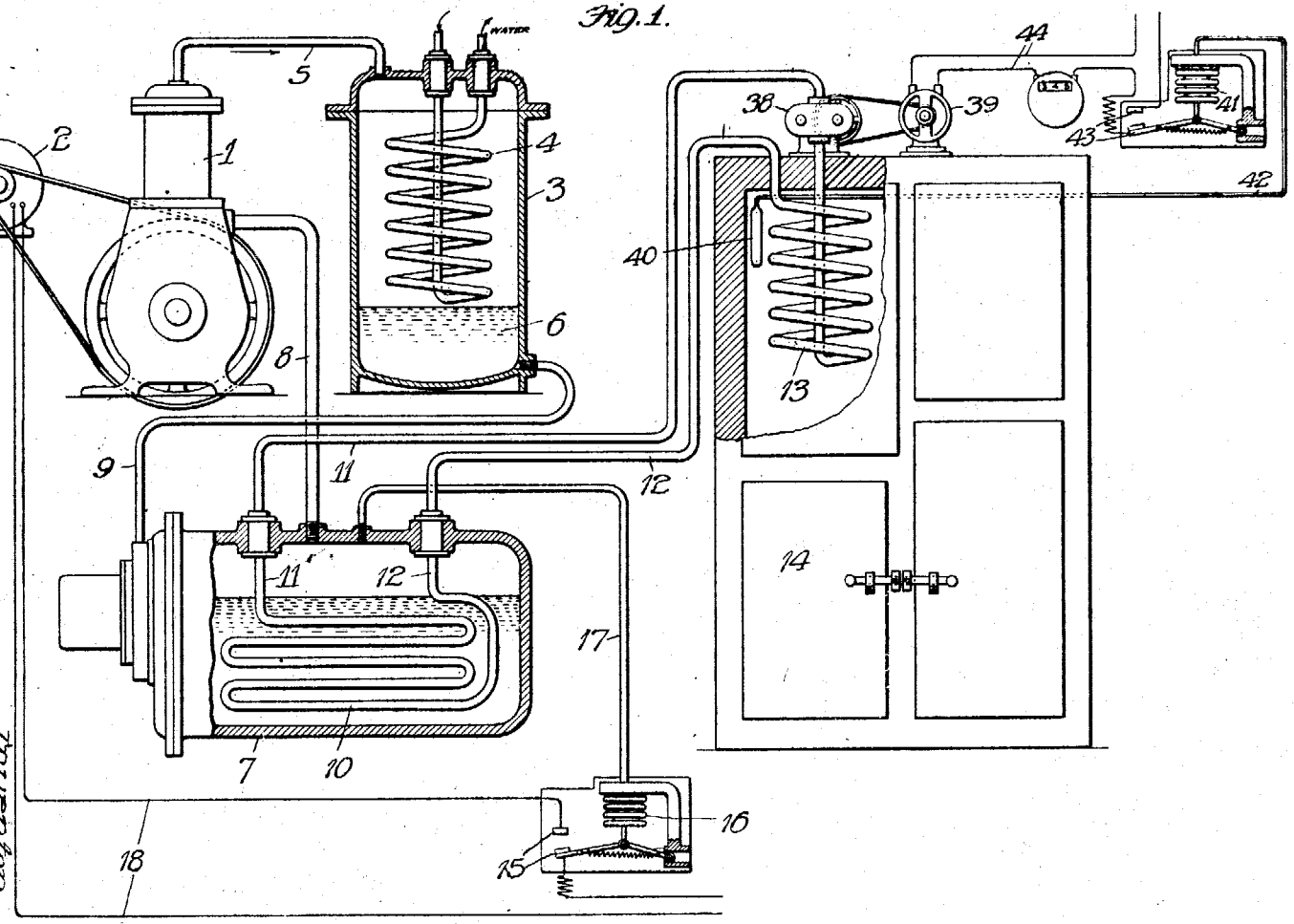
Figure 6:
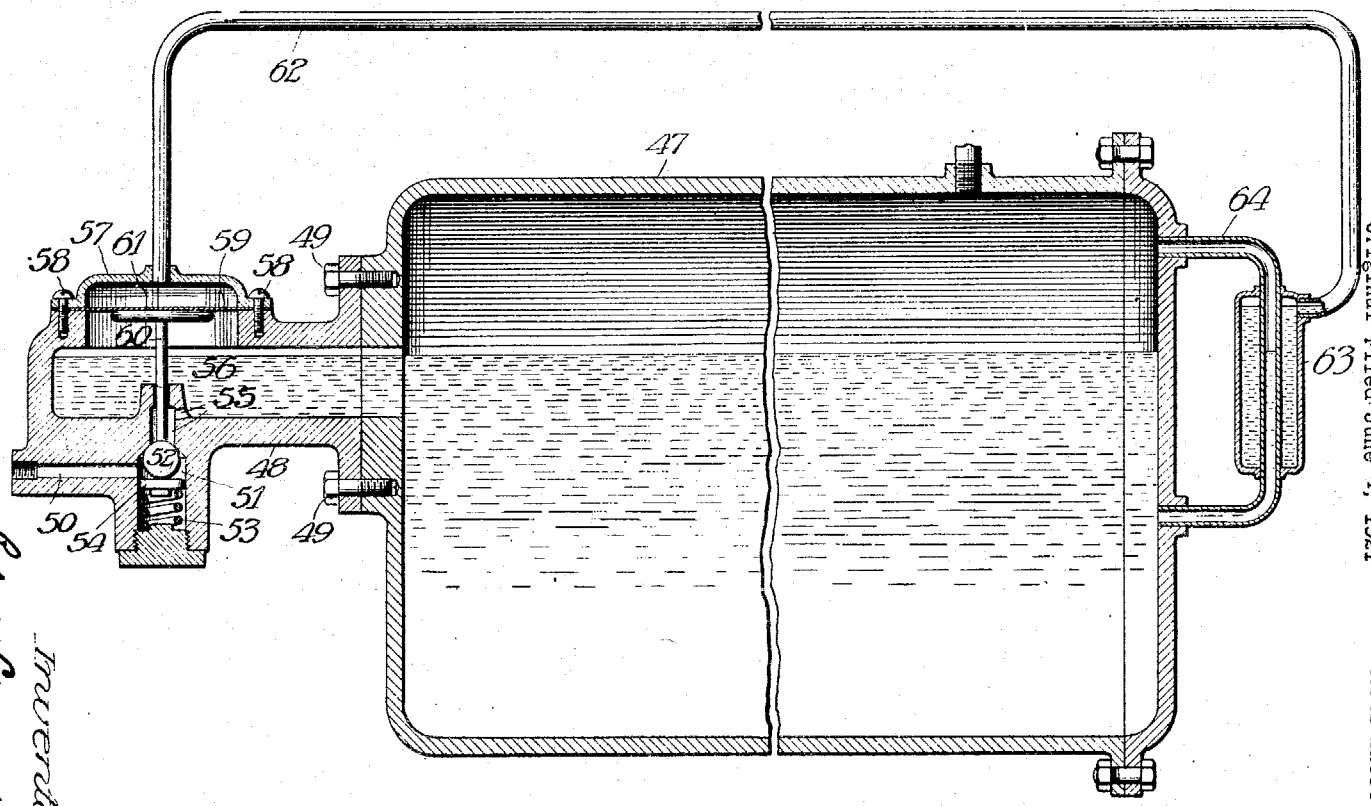

In the drawings Fig. 1 is an elevation partly in section and somewhat in diagram of a system embodying my invention and accomplishing the first above named object; Fig. 2 a longitudinal section on the line 2—2 of Fig. 3; Fig. 3 a sectional elevation on a line 3—3 of Fig. 2; Fig. 4 a section on the line 4—4 of Fig. 3; Fig. 5 an enlarged detail view showing the means for insulating the control chamber from the evaporator; Fig. 6 a longitudinal section of an evaporator and associated parts illustrating a modified form of construction; and Fig. 7 an elevation partly in section showing the apparatus accomplishing the second mentioned object of my invention.

Referring to the particular embodiment of my invention as shown in Figs. 1 to 5 the refrigerating apparatus proper includes a motor operated compressor, a condenser, an evaporator, all of which are properly connected together by conduits or piping, and cooling means of some kind such as a cooling coil. As shown in Fig. 1 the compressor 1 which may be of any desired type is driven by a motor such as the electric motor 2. The condenser 3 may likewise be of any desired type and provided with the coil 4 through which the cooling water circulates for cooling the compressed gas pump by the compressor through the pipe 5 into the condenser wherein the gas is condensed to the liquid form as indicated at 6 in the bottom of the condenser.

The flooded receptacle 7 which will be hereinafter for convenience termed the evaporator, may be of any suitable shape and dimensions and the same is connected with the compressor and with the condenser. This evaporator is connected with the suction of the compressor by the pipe 8, such connection forming the outlet connection of the evaporator, and such evaporator is connected with the condenser by the pipe 9 which forms the inlet connection for such evaporator.

The evaporator is provided in its interior with a heat absorbing coil 10 which is submerged within the liquid refrigerant therein. This coil is connected by means of the pipes 11 and 12 with a cooling means such as a coil 13 located in a suitable place such as in the cooling chamber of a refrigerator 14. If desired this cooling coil may be submerged in a brine solution arranged within a refrigerator or the like. It is obvious that in the broader aspect of my invention, the brine circulating system may be omitted and the evaporator itself used directly as the refrigerating element.

The electric motor 2 is adapted to be controlled by means of any suitable type of pressure controlled switch such as that indicated at 15, the same being in the present instance operated by a collapsible diaphragm 16 which is in turn operated by the pressure admitted thereto from the evaporator through the pipe 17. This switch is connected by the wires 18 with the electric motor.

The means for regulating the liquid level in the evaporator is shown in detail in Figs. 2 to 5. The evaporator is provided at one end with a removable head 19 provided with an opening 20 through which projects a part of the controlling valve mechanism which is mounted in the plate 21. This plate is secured to the head 19 in suitable manner as by means of the screws 22. To this plate and preferably heat insulated therefrom is a control chamber 23 which has marginal flanges 24 attached to the plate 21 through the interposed ring 25 of insulating material. As shown in Fig. 5 the securing means are special screws 26 which together with the openings through the flange 24 and ring 25 are such as to insulate the chamber from the evaporator. Referring to details insulating washers 27 are provided between the heads of these screws and the flange 24 and the hole through the ring 25 is enlarged so as not to contact the shank of the screw. As a result the chamber 23 is insulated from the ring 21 and the evaporator.

The inlet pipe 9 is connected with a radial passage 28 in the plate 21 and communicates with a valve chamber 29 whose outlet port 30 is governed by check valve such as the spring pressed ball 31. This outlet communicates with the passage 32 extending into the evaporator and adapted to supply the latter with the liquid refrigerant. The check valve or ball is automatically operated and is opened when the liquid in the evaporator reaches a predetermined low point and is closed when the liquid reaches its proper predetermined level.

The automatic means for controlling the valve which governs the inlet connection to the evaporator consists in the present instance of a device which broadly speaking is a pressure controlled movable member, in the present instance a collapsible diaphragm or expansible chamber 33 located within the control chamber 23 and of less size than the interior of such chamber so as to leave an intervening space therearound for a body 34 of liquid refrigerant which is trapped therein. The interior of the collapsible diaphragm communicates with the evaporator through a vent passage 20[a] and through a liquid supply passage 20[b]. This collapsible diaphragm is provided with an annular flange 35 which is clamped between the flange 24 and the ring 25. The collapsible diaphragm is provided with a stem 36 guided in the outward extension 37 of the plate 21 and extending into the enlarged passage 30 and adapted to contact the ball 31 and force the same from its seat when moved inwardly.

Next describing the cooling coil and its associated parts, the same is preferably provided with a circulating pump 38 for maintaining circulation through the coil although the same could be maintained by thermal action. As shown this pump which may be of any suitable character, is driven by the electric motor 39 which may be controlled by any suitable switch but in the present instance I have shown a control consisting of a bulb 40 arranged within the cooling chamber and adjacent the cooling coil and containing a volatile liquid, the pressure of which is conducted to the collapsible diaphragm 41 through the pipe 42. This collapsible diaphragm operates the switch 43 which is connected by the electric wires 44 with the motor 39.

Describing the operation of this flooded refrigerating system and the liquid level control of the evaporator, the liquid refrigerant passes through the pipe 9 to the evaporator wherein it is admitted through the liquid level regulator which maintains a constant level of the refrigerant therein. Under the action of the compressor whose suction side is connected with the evaporator, the pressure in the evaporator is reduced, with the result that the liquid boils at low temperature, thus absorbing heat from the submerged coil 10 in which a non-freezing liquid, such as brine or diluted alcohol circulates. A part of the pipe system containing this circulating liquid is the cooling coil 13 which is here shown located in the refrigerator. The circulation through this pipe system is enforced in the present instance by means of the circulating pump 38.

In the present instance this circulating pump 38 is driven by it own electric motor 39 and such motor is stopped and started by the switch 43 which is under the influence of the thermostat or bulb 40. Under the action of this thermostat, the motor 39 is started when the temperature in the refrigerator reaches a predetermined high point and such motor is stopped again when the temperature in the refrigerator reaches a predetermined low point. As the pressure of the volatile liquid in this bulb 40 changes with changes of temperature, the collapsible diaphragm 41 expands or contracts, thereby operating the switch 43.

When a certain pre-determined high pressure in the evaporator is reached the motor 2 which operates the compressor is automatically started and when a pre-determined low pressure in the evaporator is reached such motor is automatically stopped. The switch 15 which accomplishes this purpose is shown as of the collapsible diaphragm operated type and any suitable type of pressure controlled switch may be used for this purpose.

The above mentioned pressure variations in the evaporator correspond to temperature changes of the liquid refrigerant in the evaporator. When the refrigerant in the evaporator absorbs heat from the coil 10, its temperature and consequently its pressure rises. When the pressure of the refrigerant in the evaporator is reduced, due to the action of the compressor, its temperature also falls and it boils on account of its absorbing heat from the coil 10. Therefore, the compressor may be automatically stopped and started under the influence of a thermostat immersed in the liquid in the evaporator, with the same results as the above described pressure regulation.

Describing the action of the automatic means or collapsible diaphragm 33 which regulates the liquid level in the evaporator, the collapsible diaphragm is partially filled in its interior with the same liquid refrigerant as in the evaporator and to the same level thereof and it is surrounded at its outer end and sides with the trapped body 34 of the same character of liquid refrigerant, the chamber 23 being insulated from the evaporator so as not to be affected by the temperature thereof which would otherwise be conducted through the end head and plate 21. When the liquid level in the evaporator falls below the pre-determined level and when for instance this level is below the line of the passage 20[b], there will be no liquid inside of the collapsible diaphragm, the small residue therein evaporating rapidly. The trapped liquid between the collapsible diaphragm and the chamber or cap 23 being under the influence of the outside temperature will be warmer than the liquid within the evaporator. The pressure of this trapped refrigerant will therefore be higher than the pressure inside the evaporator with the result that this higher pressure will compress the collapsible diaphragm and force the stem 36 inwardly forcing the ball valve from its seat against the tension of the spring 45 and interposed disk 46 and admitting a supply of liquid refrigerant through the passages 30 and 32. When the liquid level in the evaporator rises, cold liquid enters the collapsible diaphragm 33 and by heat conduction through the walls of the collapsible diaphragm the temperature of the trapped liquid is reduced with the result that the pressure of such trapped liquid will be likewise reduced. As a result the spring 45 will seat the valve and close the inlet against further admission of the liquid refrigerant to the evaporator. It will be understood that any suitable liquid may be employed in the space around the collapsible diaphragm 33 but I prefer to employ the same liquid as used in the evaporator.

The above described control means have the effect of operating the electric motor 2 in accordance with the requirements of the refrigerator. When the conditions in the refrigerator are such that a small amount of refrigeration is required, then the circulating pump 38 will remain idle for long periods of time which in turn will cause the refrigerant in the evaporator to remain at low temperature and consequently at low pressure for long periods of time. This in turn causes the motor 2 to remain idle for corresponding long periods of time. If on the other hand the refrigerator requires a large amount of refrigeration, the motor 39 will operate the circulating pump 38 at frequent intervals which will in turn influence the temperature and consequently the pressure of the refrigerant in the evaporator, with the result that there will be frequent or long period operations of the motor 2.

In Fig. 6 I have shown a modified form of construction but operating on the same principle. As shown the evaporator 47 is provided at one end with a valve casing 48 secured thereto by the bolts 49 and containing the valve mechanism and control devices for controlling the admission of the liquid refrigerant into the evaporator and maintaining a constant level therein. This casing is provided with the inlet 50 leading into the valve chamber 51 in which is contained the valve which is here a ball valve 52 normally seated by the spring 53 and interposed movable disk 54. This ball controls a port leading from the chamber 51 to the inlet or supply passages 55 in the chamber 56 of the casing. This chamber is in constant communication with the interior of the evaporator and has the same liquid level as the latter.

The casing 48 is provided with a removable cap 57 which is secured thereto by the screws 58, between which casing and cap there is clamped the margin of a movable abutment or diaphragm 59. To this diaphragm there is secured a stem 60 whose lower end is adapted to contact and force the ball valve 52 from its seat when this diaphragm is operated. The space or chamber 61 above the diaphragm communicates by means of pipe 62 with a control chamber 63 which in the present instance surrounds a by-pass pipe connection 64 communicating with the evaporator at different heights thereof. This chamber 63 contains a volatile liquid preferably the same kind of liquid refrigerant as employed in the evaporator.

When the evaporator level lowers the liquid within the chamber 63 will become heated by outside temperature and the pressure thereof will increase which pressure will be transmitted through the pipe 62 to the diaphragm whereupon an additional supply of the refrigerant will be admitted to the evaporator. When the proper liquid level in the evaporator is reached the liquid in the chamber 63 will be cooled by such admitted liquid and the pressure upon the top of the diaphragm 59 will be relieved, thereby permitting the spring 53 to seat the valve 52.

Figure 7:
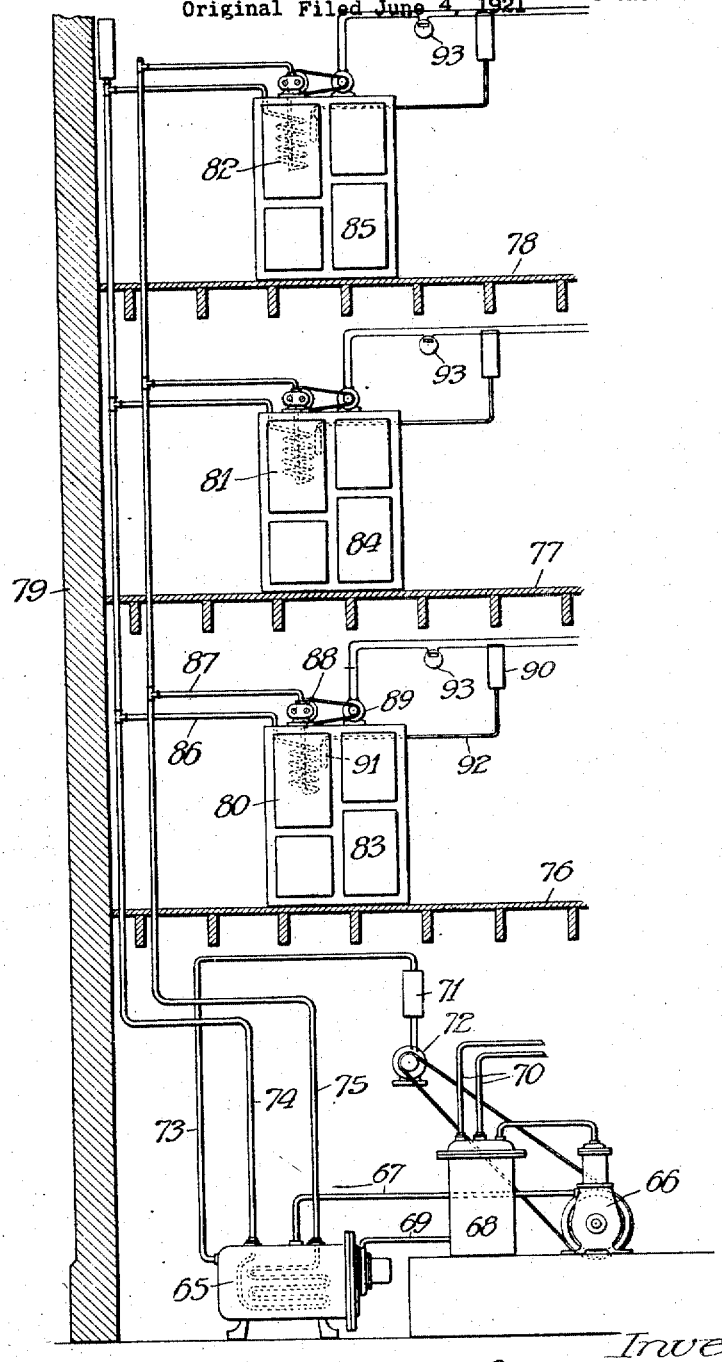

My refrigerating apparatus is so constructed and operated that it is capable of acting as a refrigerating plant common to a plurality of cooling coils or refrigerators, thereby producing a refrigerating system of great practical utility wherever a number of refrigerators are used in substantially close proximity as for instance in apartment buildings and the like. In Fig. 7 I have shown such a system, illustrating the same in a building of three stories with the refrigerating apparatus on the first floor or in the basement. As shown the evaporator 65 is connected to the compressor 66 by the pipe 67 and with the condenser 68 by the pipe 69. The water circulation pipes for the condenser are shown at 70. The evaporator is connected to the pressure controlled switch 71 which governs the motor 72, through the pipe 73. The evaporator is also provided with the main supply and return pipes 74 and 75 which extend upwardly through the floors 76, 77 and 78 of the building 79 and connect by means of take-off pipes with a series of refrigerating coils 80, 81 and 82 located in the refrigerators 83, 84 and 85 respectively. These take-off pipes indicated at 86 and 87 are similar for each refrigerator and the remainder of the apparatus and connections associated with each refrigerator are the same, including the circulating pump 88, motor 89 and switch 90 connected with the bulb 91 through the pipe 92. It will be understood that the pipes 74 and 75 contain brine or diluted alcohol in the same manner as the corresponding pipes 11 and 12 shown in Fig. 1. The operation and control are the same as described above in connection with the apparatus of Fig. 1 but it will be understood that the refrigerators are separately and independently controlled according to the temperature in any particular refrigerator.

As an additional feature each circulating pump motor may be provided with an individual electric meter such as shown at 93. As the refrigerating liquid such as brine or diluted alcohol will be circulated in accordance with the requirements of each individual refrigerator, the amount of the current consumed by the circulating pump motor is proportionate to the amount of refrigeration used in each individual refrigerator. The charge for the service can then be properly based on the circulating pump motor meter reading. In case the operation of this pump is intermittent, responding to high and low refrigerator temperatures, the metering can be accomplished by a device capable of recording the percentages of running time of the pump motor and the charge can be based on this running time percentage instead of on the current consumption readings.

I claim:—

1. Refrigerating apparatus of the class described, comprising an evaporator normally containing therein a quantity of liquid refrigerant and having inlet and outlet connections for the refrigerant, and thermostatic means responding to a fall in level of said liquid refrigerant and cooperating with one of said connections for maintaining the level of the refrigerant in the evaporator within predetermined limits.

2. Refrigerating apparatus of the class described, comprising an evaporator normally containing therein a quantity of liquid refrigerant and having inlet and outlet connections for the refrigerant, and thermostatic means cooperating with one of said connections for maintaining the level of the refrigerant in the evaporator within predetermined limits, said thermostatic means being disposed in heat-exchange relationship with the liquid refrigerant in said evaporator.

3. Refrigerating apparatus of the class described, comprising an evaporator normally containing therein a quantity of liquid refrigerant and having inlet and outlet connections for the refrigerant, and thermostatic means cooperating with one of said connections for maintaining the level of the refrigerant in the evaporator within predetermined limits, said thermostatic means being disposed in direct but varying heat-exchange relationship with the body of liquid refrigerant in said evaporator.

4. Refrigerating apparatus of the class described, comprising an evaporator containing therein a body of liquid refrigerant and having inlet and outlet connections for the refrigerant, and mechanism for regulating the level of the refrigerant in the evaporator, comprising a valve governing such inlet connection, an expansible thermostatic member spaced from the main body of liquid refrigerant in said evaporator and adapted to control such valve, and conduit means for establishing a liquid-refrigerant connection between the main body of refrigerant and said expansible thermostatic member.

5. Refrigerating apparatus of the class described, comprising an evaporator containing therein a body of liquid refrigerant and having inlet and outlet connections for the refrigerant, and mechanism for regulating the level of the refrigerant in the evaporator, comprising a valve governing such inlet connection, an expansible thermostatic member spaced from the main body of liquid refrigerant in said evaporator and adapted to control such valve, and conduit means for establishing a liquid-refrigerant connection between the main body of refrigerant and said expansible thermostatic member, said conduit means including a liquid passage below the normal high level of the liquid refrigerant and a vent passage above the normal high level of the liquid refrigerant.

6. Refrigerating apparatus of the class described, comprising an evaporator containing therein a body of liquid refrigerant and having inlet and outlet connections for the refrigerant, and mechanism for regulating the level of the refrigerant in the evaporator comprising an expansible chamber disposed in heat-exchange relationship with said body of refrigerant and containing an expansible fluid therein, and a valve governing such inlet connection and itself controlled by said expansible chamber.

7. Refrigerating apparatus of the class described, comprising an evaporator containing therein a body of liquid refrigerant and having inlet and outlet connections for the refrigerant, and mechanism for regulating the level of the refrigerant in the evaporator comprising an expansible chamber containing an expansible fluid therein, said expansible chamber having a movable wall located adjacent the evaporator, means for establishing liquid-refrigerant connection between said body of refrigerant and said wall, and a valve governing such inlet connection and itself controlled by the movable wall.

8. Refrigerating apparatus of the class described, comprising an evaporator containing therein a body of liquid refrigerant and having inlet and outlet connections for the refrigerant, and mechanism for regulating the level of the refrigerant in the evaporator comprising an expansible chamber containing an expansible fluid therein, said expansible chamber having a metallic corrugated bellows movable wall adjacent the evaporator and disposed in reentrant relationship with the remainder of the expansible chamber, and a valve governing such inlet connection and itself controlled by the movable wall.

9. Refrigerating apparatus of the class described, comprising an evaporator containing therein a body of liquid refrigerant and having inlet and outlet connections for the refrigerant, and mechanism for regulating the level of the refrigerant in the evaporator comprising an expansible chamber containing an expansible fluid therein, said expansible chamber having a cup-shaped member, a metallic corrugated bellows within the cup-shaped member, one end of the bellows being sealed by an end wall and the other end being sealed with the cup-shaped member, means for establishing a heat-exchange relationship between the corrugated bellows and said body of refrigerant, a valve governing the inlet connection, and a connection between said end wall and said valve for actuating the latter.

10. Refrigerating apparatus of the class described, comprising an evaporator normally containing therein a quantity of liquid refrigerant and having inlet and outlet connections for the refrigerant, thermostatic means cooperating with one of said connections for maintaining the level of the refrigerant in the evaporator within predetermined limits, said evaporator having a side opening, and a plate removably secured in said opening and supporting said thermostatic means.

11. A refrigerating system including a series of cooling chambers, cooling means therein, main supply and return pipes for the refrigerant common to all such cooling means, individual pairs of supply and return pipes connecting between each cooling means and such main pipes, independently controlled pumps associated with said individual pairs of pipes, and a refrigerating apparatus including an evaporator connected with said main pipes and a condenser and a compressor connected with each other and with the evaporator.

12. Refrigerating apparatus of the class described, comprising a chamber normally containing therein a liquid-cooling agent, and thermostatic means for maintaining the level of said liquid-cooling agent within predetermined limits, said means comprising an expansible chamber thermally isolated from said cooling agent and in heat-exchange relationship with the atmosphere, and means establishing a heat-exchange relationship between said cooling agent and said expansible chamber.

13. In apparatus for cooling liquids, the combination of a closed refrigeration system including means for liquefying refrigerant vapor and a vaporizer chamber adapted to receive the liquefied refrigerant; a conduit for the liquid to be cooled comprising a heat absorbing section having its wall in contact on one side with the liquid refrigerant in the vaporizer; means associated with the conduit by which the liquid to be cooled is subject to demand intermittently at variable rates; and means operating automatically with change of temperature of the liquid refrigerant in the vaporizer chamber to vary the operation of the refrigerant liquefying means and thereby maintain the temperature of the said liquid refrigerant within a limited predetermined range; the said section of the conduit being proportioned to direct the liquid to be cooled in a predetermined path.

14. In apparatus for cooling liquids, the combination of a closed refrigeration system including a means for liquefying refrigerant vapor, a vaporizer chamber, and means operating in conjunction with the refrigerant liquefying means for automatically maintaining a body of liquid refrigerant in said chamber; a conduit for the liquid to be cooled comprising a heat absorbing section immersed in the said body of liquid refrigerant; means associated with the conduit by which the liquid to be cooled is subject to demand intermittently at variable rates; and means operating automatically with change of temperature of the liquid refrigerant in the vaporizer chamber to stop and start the refrigerant liquefying means and thereby maintain the temperature of the said liquid refrigerant within a limited predetermined range; the said immersed section of the conduit being proportioned to direct the liquid to be cooled in a predetermined path.

15. In apparatus for cooling liquids, the combination of a closed refrigeration system including a motor driven compressor, a condenser, a vaporizer chamber, and means operating in conjunction with the compressor and condenser for automatically maintaining a body of liquid refrigerant in said chamber; a conduit for the liquid to be cooled comprising a heat absorbing section immersed in the said body of liquid refrigerant; means associated with the conduit by which the liquid to be cooled is subject to demand intermittently at variable rates; and means operating automatically with change of temperature of the liquid refrigerant in the vaporizer chamber to stop and start the compressor and thereby maintain the temperature of the said liquid refrigerant within a limited predetermined range; the said immersed section of the conduit being proportioned to direct the liquid to be cooled in a predetermined path.

16. In apparatus for cooling flowing liquids, the combination of a closed refrigeration system including means for liquefying refrigerant vapor and a vaporizer chamber adapted to receive the liquefied refrigerant; a conduit for the liquid to be cooled comprising a heat absorbing section having its wall in contact on one side with the liquid refrigerant in the vaporizer; means associated with the conduit causing variation of the heat content of the liquid entering said heat absorbing section of the conduit per unit of time; and means operating automatically with change of temperature of the liquid refrigerant in the vaporizer chamber to vary the operation of the refrigerant liquefying means and thereby maintain the temperature of the said liquid refrigerant within a limited predetermined range; the said section of the conduit being proportioned to direct the liquid to be cooled in a predetermined path.

17. In apparatus for cooling flowing liquids, the combination of a closed refrigeration system including a means for liquefying refrigerant vapor, a vaporizer chamber, and means operating in conjunction with the refrigerant liquefying means for automatically maintaining a body of liquid refrigerant in said chamber; a conduit for the liquid to be cooled comprising a heat absorbing section immersed in the said body of liquid refrigerant; means associated with the conduit causing variation of the heat content of the liquid entering said heat absorbing section of the conduit per unit of time; and means operating automatically with change of temperature of the liquid refrigerant in the vaporizer chamber to stop and start the refrigerant liquefying means and thereby maintain the temperature of the said liquid refrigerant within a limited predetermined range; the said immersed section of the conduit being proportioned to direct the liquid to be cooled in a predetermined path.

18. In apparatus for cooling flowing liquids, the combination of a closed refrigeration system including a motor driven compressor, a condenser, a vaporizer chamber, and means operating in conjunction with the compressor and condenser for automatically maintaining a body of liquid refrigerant in said chamber; a conduit for the liquid to be cooled comprising a heat absorbing section immersed in the said body of liquid refrigerant; means associated with the conduit causing variation of the liquid entering the said heat absorbing section of the conduit per unit of time; and means operating automatically with change of temperature of the liquid refrigerant in the vaporizer chamber to stop and start the compressor and thereby maintain the temperature of the said liquid refrigerant within a limited predetermined range; the said immersed section of the conduit being proportioned to direct the liquid to be cooled in a predetermined path.

In testimony whereof I hereby affix my signature.

ROBERT CRAMER.